US006783141B1

(12) United States Patent
Backhaus (10) Patent No.: US 6,783,141 B1
(45) Date of Patent: Aug. 31, 2004

(54) THEFT-PROTECTION DEVICE FOR BICYCLES

(76) Inventor: Christian Backhaus, Fesenfeld 34, D-28203, Bremen (DE)

(*) Notice: Subject to any disclaimer, the term of this patent is extended or adjusted under 35 U.S.C. 154(b) by 0 days.

(21) Appl. No.: 10/031,077

(22) PCT Filed: Jun. 28, 2000

(86) PCT No.: PCT/EP00/06015
§ 371 (c)(1),
(2), (4) Date: May 20, 2002

(87) PCT Pub. No.: WO01/05645
PCT Pub. Date: Jan. 25, 2001

(30) Foreign Application Priority Data

Jul. 15, 1999 (DE) .......................... 199 33 102
Sep. 22, 1999 (DE) .......................... 199 45 284

(51) Int. Cl.⁷ .............................................. B62K 19/32
(52) U.S. Cl. ....................................... 280/279; 74/551.1
(58) Field of Search ................................ 280/271, 272, 280/279, 280, 281.1, 278, 287; 74/548, 551.1, 551.3, 551.4, 551.8; 403/374.1, 374.3, 379.3, 379.4, 322.1, 323, 294, 297, 292, 293

(56) References Cited

U.S. PATENT DOCUMENTS

| | | | | |
|---|---|---|---|---|
| 448,850 A | * | 3/1891 | Riess ........................ 280/272 |
| 449,383 A | * | 3/1891 | Rathbun ..................... 280/272 |
| 579,664 A | * | 3/1897 | McConley ................... 280/272 |
| 612,989 A | * | 10/1898 | Hunter et al. ................ 403/321 |
| 636,133 A | * | 10/1899 | Goodson ..................... 280/279 |
| 1,668,571 A | * | 5/1928 | Niederberger ............... 280/279 |
| 2,308,542 A | * | 1/1943 | Raybould .................... 403/297 |
| 2,645,509 A | * | 7/1953 | Valenta ....................... 403/297 |
| 2,657,944 A | * | 11/1953 | Miller ........................ 403/297 |
| 3,136,149 A | * | 6/1964 | Klein, Jr. ...................... 70/187 |
| 4,410,197 A | * | 10/1983 | St. Hillaire ................. 280/279 |
| 5,003,839 A | * | 4/1991 | Yang ......................... 74/551.1 |
| 5,269,550 A | * | 12/1993 | Hon et al. ................... 280/278 |
| 5,540,457 A | * | 7/1996 | Johnson ..................... 280/279 |
| 5,588,336 A | * | 12/1996 | Chou ........................ 74/551.1 |
| 5,832,753 A | | 11/1998 | Nielsen |

FOREIGN PATENT DOCUMENTS

| | | |
|---|---|---|
| DE | G 94 17 468.7 U1 | 2/1995 |
| DE | 197 22 892 A1 | 12/1998 |
| DE | G 94 15 490.2 U1 | 2/2002 |
| GB | 2184191 * | 6/1987 |

* cited by examiner

Primary Examiner—Anne Marie Boehler
(74) Attorney, Agent, or Firm—Hahn Loeser & Parks, LLP; Robert J. Clark (57) ABSTRACT

With the invention is presented an anti-theft device for bicycles, which comprise a bicycle frame (2) and a steering column (14) mounted on the bicycle frame (2) for steering the bicycle, which steering column is provided for a rotationally fixed coupling of bicycle handlebars (6) with a fork (5) for a front wheel (4), having a separating means for nuetralising the rotationally fixed coupling, wherein a coupling piece (8) or a connecting element (60) is provided as separating means, which divides the steering column (14) into two parts (34) and produces the rotationally fixed coupling of these steering column parts (34) in a first state and neutralises it in a second state.

19 Claims, 10 Drawing Sheets

THEFT-PROTECTION DEVICE FOR BICYCLES

The invention relates to an anti-theft device for bicycles, which comprise a bicycle frame and a steering column mounted on the bicycle frame for steering the bicycle, which steering column is provided for a rotationally fixed coupling of a bicycle handlebar with a fork for a front wheel, having a separating means for neutralising the rotationally fixed coupling.

BACKGROUND OF THE ART

Such anti-theft devices are known. Unlike a conventional U lock, for instance, which in a secured position is disposed in an exposed position on the bicycle and for this reason provides a thief with contact points for possibly forced opening, the above-mentioned anti-theft device enables improved protection of the bicycle against theft, since the thief, even if he is prepared to use force, cannot neutralise the action of the anti-theft device without damaging the bicycle.

In the case of a U-type lock, a classic security principle comes to be used, which consists in bringing parts which are constructed on the article to be secure and move in relation to one another into a more or less fixed or stationary position with respect to one another so that the movability of the parts is limited and the item cannot be used in the secured position. Provided that the item to be secured is a bicycle, as is known free rotatability of the rear wheel, for instance, is prevented by the U-type lock being placed both around a tube of the bicycle frame and also around a portion of the rim of the rear wheel and then being locked.

Alternatively, the U-type lock can also be positioned around the tube of the bicycle frame and around a fixed object, such as, for instance, a lamp post, so as to prevent the movability of the bicycle overall.

WO 92/10392 discloses a handlebar locking device for bicycles. The device comprises a locking mechanism in a handlebar front part, which brings the handlebar front part either in a non-secured position to engage with the front wheel fork or in the secured position separates it from said fork so that the steering column and the front wheel forks are freely rotatable with respect to one another. A steering column fixed to the front wheel fork and a tubular piece fixed to the handlebar front part are connected to one another in rotationally fixed manner in the non-secured position and can rotate together in a bicycle frame section. A cam actuated by means of a key moves a roller lock disposed in the steering column radially outwards and for releasing the safety device introduces it into a socket situated in the tubular piece so that the bicycle can be controlled. The cam also enables the introduction of the roller lock into an opening which is provided to separate the front wheel fork from the handlebar fore part, so that the bicycle cannot be steered and as a result is protected against theft. The known anti-theft device thus works in reverse to the safety principle described above in that to be precise a secure connection of two parts which is required for the operation of the bicycle is removed in the secured position.

The known anti-theft device offers no practical opportunity for producing a release of the lock by the application of force. The known anti-theft device is nevertheless disadvantageous inasmuch as a skilled thief may neutralise it to release the security device of the bicycle without causing any damage. This is of course a problem with respect to the protection of valuable bicycles, which are naturally of interest to a thief and with which, to obtain their resale value, an application of brute force is out of the question for the conscientious thief, so that the thief is prepared to study and learn the unauthorised nuetralisation of the anti-theft device in detail.

The object of the invention is to create an anti-theft device for bicycles, the release of which poses a thief a considerably more difficult task than known anti-theft devices.

SUMMARY OF THE INVENTION

This object is achieved with the device of the type mentioned at the beginning in that a coupling piece or a connecting element is provided as a separating means, which divides the steering column into two parts and which produces the rotationally fixed coupling of these steering column parts in a first state and neutralises it in the second state.

With the invention one obtains an anti-theft device which is clearly more difficult to release than known anti-theft devices when the coupling piece or the connecting element is removed by a user from the bicycle in a secured position. The anti-theft device according to the invention is highly integrated into the bicycle.

The coupling piece or the connecting element has an essentially reflection-symmetrical or point-symmetrical design. On either side of the plane of symmetry it has recesses and/or projections, which in the first state are in engagement with complementary means constructed on the steering column parts and at the same time produce a form-fit and/or frictional connection and in the second state are released from the complementary means.

In a first embodiment of the invention, the coupling piece is constructed with a column piece, which in the first state is inserted between the parts of the steering column and aligns with them and which in the second state is completely removed from the parts of the steering column. In the first state the bicycle is not secured. The column piece inserted between the parts of the steering column enables a rotationally fixed connection of the parts of the steering column with one another, so that the steering column with the coupling piece according to the invention is in practice not restricted in its function in comparison with a conventional steering column. The bicycle is secured in the second state. The parts of the steering column are disposed with coaxial spacing in relation to one another. The coupling piece, which is completely removed in the second state, is required to produce a connection of the parts of the steering column and thus the operability of the steering column again. Provided that a correct coupling piece is not inserted between the parts of the steering column, the use of the bicycle is prevented and is therefore of no interest to a thief.

Furthermore, the coupling piece comprises two coupling sleeves disposed axially next to one another. The column piece is housed in the coupling sleeves. The coupling sleeves comprise external threads, which are provided for an engagement with an internal thread in the respective adjacent portion of the bicycle frame. In the secured position the coupling sleeves are axially adjacent; in the non-secured position they are spaced from one another. Upon the transition from the secured position into the non-secured position, the coupling sleeves are screwed into the respective adjacent portion of the bicycle frame. Provided that the coupling sleeves have threads running in the same direction, the directions of rotation of the coupling sleeves are opposite during screwing in and unscrewing. It is advantageous if the coupling sleeves have threads running in opposite directions to one another, because then the directions of rotation of the two coupling sleeves agree when screwing in and unscrewing. The column piece can preferably be twisted coaxially in the coupling sleeves around its longitudinal axis and is also disposed to be axially displaceable.

In a preferred embodiment, the external threads on the coupling sleeves and the associated internal threads in the respective adjacent portion of the bicycle frame are individually matched to one another. As a result of the individual matching of the threads to be made to mesh with one another, only the external threads situated on the associated coupling pieces can be screwed into the respective adjacent portion of the bicycle frame. A different coupling piece to that individually provided in contrast has coupling sleeves whose external threads cannot be brought into engagement with the internal thread of the respective adjacent portion of the bicycle frame. With this individualisation of the coupling piece with respect to the particular bicycle frame, a particularly high degree of protection against theft is achieved.

The threads are preferably multiple-start, so that upon a rotation of the coupling sleeves a relatively large axial movement of the coupling sleeves is possible. Just one revolution of the coupling sleeves around the column piece is particularly preferably sufficient to achieve an axial movement by a predetermined insertion length of the respective coupling sleeve. With this preferred embodiment, a simple rotation of the coupling sleeves is sufficient to secure and release the safety device of the bicycle.

The column piece and the coupling sleeves are housed in a protecting tube. The protecting tube can be detached from the bicycle frame and comprises axially displaceable carriers. The carriers entrain the coupling sleeves upon a rotation of the protecting sleeve in relation to the bicycle frame. The carriers are preferably constructed as radial pins, which protrude outwardly through at least one axial slot in the protecting tube and of which one of the pins is engaged with one of the coupling sleeves. The protecting tube protects the user from dirt, which occurs, for instance, by lubricants from the connection between coupling sleeves and column pieces. The protecting tube also protects the column piece and the coupling sleeves from the entry of impurities and moisture, by which effective protection against corrosion in particular is achieved. If the device is in the non-secured position, the protecting tube also protects the adjacent portions of the bicycle frame from the entry of impurities and moisture. For the user the protecting tube reduces the danger of injury, since it preferably closes smoothly with the bicycle frame, so that the operation of the anti-theft device is particularly simple. Because the protecting tube is inserted into the bicycle frame, the anti-theft device according to the invention is disposed in a particularly inconspicuous manner in the bicycle. Alternatively, the protecting tube can be made conspicuous in order to display the anti-theft device on the bicycle and to represent it to the user as a desirable product.

In a second embodiment of the invention, the connecting element has an annular or frame-shaped construction. It comprises engagement bars which are provided for an engagement with claws of the steering column parts in the first state. Each engagement bar is grasped by the claw of the associated steering column part in the first state, the non-secured position. The engagement bars move from the first state into the second state by a first rotational movement of the connecting element around its centre axis at preferably right angles to the axis of the steering column. In the second state, the secured position, the connecting element is lodged freely between the steering column parts. The connecting element can be transferred from the second state, the secured position, into the first state, the non-secured position, by a second rotational movement in the opposite direction to the first.

In the second state, through an opening in the wall of the bicycle frame portion with the steering column, the connecting element can be removed from it and inserted into it. The safety device is particularly effective when the connecting element is completely removed from the steering column. For the thief it is a very difficult task to produce the connection between the steering column parts if the correct connecting element is not available to him.

On a section of the engagement bars facing the centre axis, the connecting element preferably comprises an individual profile or fitting profile, which can be brought into engagement with a complementary profile or fitting profile on the claws. Because of the complementary profile on the claws, the construction of the individual profile on the associated portion of the connecting element is necessary for releasing the anti-theft device specified by the invention. Thus unauthorised release of the safety device is made even more difficult.

According to one embodiment of the invention, the engagement bars of the connecting element are separated from one another possibly in the plane of symmetry and are disposed with radial displaceability with respect to the centre axis. The engagement bars can be brought into engagement with locking recesses in the steering column parts.

The axial sections of the locking bars can be brought into engagement with recesses in the end sides of the steering column parts. If in the non-secured position the expansion frame halves are in each case brought to engage in the end sides of the steering column parts, it is guaranteed that an uncontrolled backward rotation out of the non-secured position, in which the steering column parts are connected to one another in rotationally fixed manner, into the secured position, in which steering column parts are separated from one another and are freely rotatable with respect to one another, is prevented. Thus the operational safety of the bicycle is guaranteed when the anti-theft device is situated in the non-secured position.

In a further development according to the invention of the connecting element, the engagement bars form an inner ring which is surrounded by an outer ring. The outer ring comprises locking bars which are separated from one another with the formation of end faces preferably in the plane of symmetry of the connecting element. The locking bars are in each case displaceably mounted on the associated engagement bar of the inner ring. The locking bars are initially stressed with respect to one another. The outer ring also comprises one or more expansion elements for pushing apart the locking bars against the initial stress. The expansion elements are in each case rotatably mounted around the centre axis between the end faces of the locking bars. By rotating the expansion elements, the locking bars can be pushed apart. In this embodiment of the invention, the operational safety is particularly high because in the non-secured position the connecting element is grasped in frictional and/or form-fit manner both by the claws and also in the corresponding recesses in the steering column parts when the locking bars are pushed apart.

In a plane through which the centre axis passes at right angles, the cross-sectional profile of the expansion element is substantially rectangular with two wide and two narrow sides, which in each case lie opposite one another. If, in the secured position, the connecting element is inserted between the steering column parts, the expansion elements are disposed between the locking bars of the outer ring in such a manner that they press with the end faces of their free ends against the wide side faces of the expansion element. The oppositely disposed end faces of the locking bars have a distance between them which essentially corresponds to the narrow side of the rectangular cross-sectional profile of the expansion element.

If the connecting element is introduced between steering column parts and the expansion elements are rotated, the locking bars and the engagement bars follow a first quarter-circle rotation of the expansion elements. The engagement bars are grasped by the claws. The connecting element cannot follow a second quarter-circle rotation of the expansion elements around the centre axis, as the engagement bars are grasped by the claws. Therefore the second quarter-circle rotation results in the expansion element between the end faces of the locking bars being rotated by 90ø. The locking bars are pushed apart or wedged apart by the expansion element according to the difference in length between the wide side and narrow side of the cross-sectional profile of the expansion element. Upon the second quarter-circle rotation of the expansion elements, the outer ring of the connecting element is thus expanded. An unintentional twisting of the expansion element is avoided by the fact that in the course of the quarter-circle rotation the locking bars have to be pushed apart against the initial stress at first up to a maximum, more precisely over the length of the diagonals of the rectangular cross-sectional profile.

The cross-sectional profile of the expansion element preferably comprises rounded corners so that the rotatability of the expansion element between the end faces of the initially stressed locking bars is increased.

The sides of the cross-sectional profile of the expansion element preferably have a concave design. The cross-sectional profile of the locking bar in the portion of the free ends preferably has a convex design so that the locking bar fits with the convex end face against the concave side face of the expansion element. With this design of the outer ring, the danger of an unintentional twisting of the expansion elements is particularly low. Thus the operational reliability of the bicycle in the non-secured position of the anti-theft device according to the invention is particularly high.

The anti-theft device according to the invention which is described above is situated in a bicycle having a bicycle frame and a steering column for steering the bicycle which is mounted on the bicycle frame and which is provided for a rotationally fixed coupling of a bicycle handlebar with a fork for a front wheel. Although the anti-theft device according to the invention which is described above is particularly suitable for protecting bicycles from theft, the person skilled in the art may easily deduce further areas of application, such as the protection of motor-driven two-wheelers or other vehicles having a steering column.

BRIEF DESCRIPTION OF THE DRAWINGS

Two exemplified embodiments of the invention are explained in further detail below by means of the drawings. Therein.

DETAILED DESCRIPTION OF THE PREFERRED EMBODIMENTS

Figure 1:
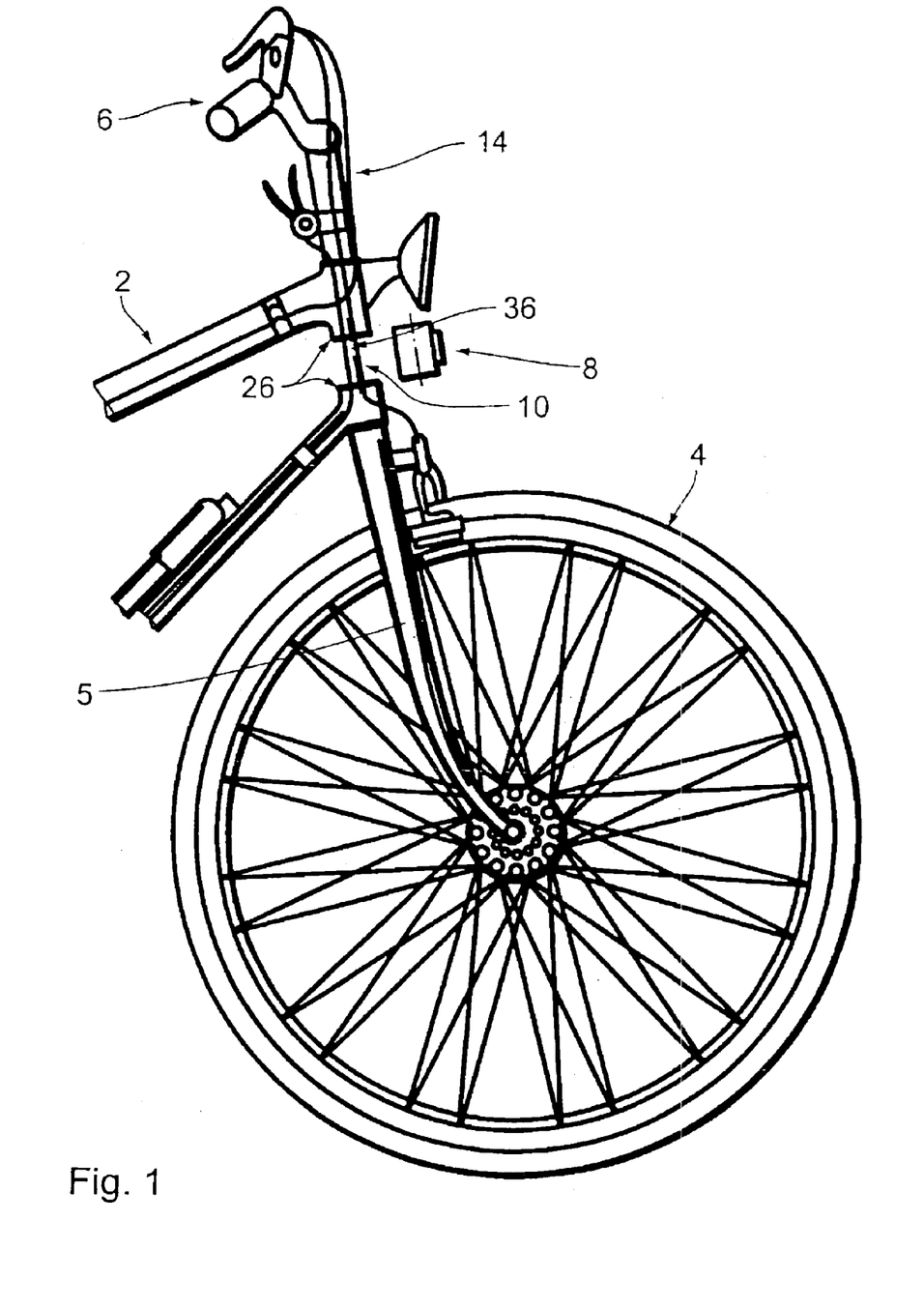
FIG. 1 shows a perspective view of a front section of a bicycle, which is equipped with a first embodiment of the anti-theft device according to the invention.

The bicycle represented in FIG. 1 is, by way of example, a conventional ladies' bicycle having a bicycle frame 2, a front wheel 4, a front wheel fork 5 and a bicycle handlebar 6, which can be connected in rotationally fixed manner by means of a steering column 14 to the front wheel fork 5. The steering column 14 is pivoted in a head tube 26 of the bicycle frame 2. The ladies' bicycle is provided with an anti-theft device as specified by the invention, in which in accordance with a first embodiment of the invention the separating means is constructed as a coupling piece 8 in such a manner that the coupling piece 8 can be inserted into a recess 10 in the head tube 26.

Figure 2:
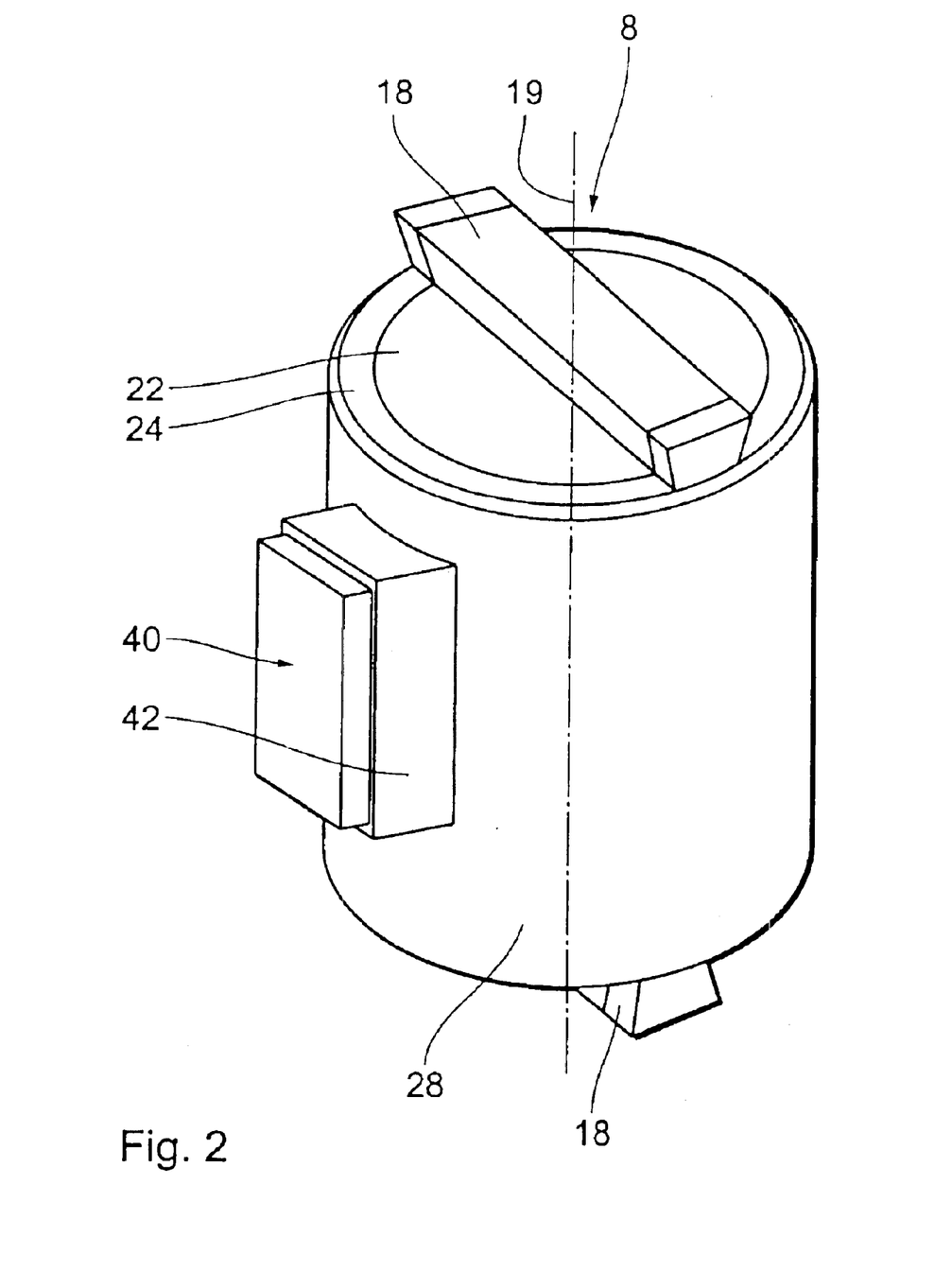
FIG. 2 shows a perspective view of a coupling piece according to the first embodiment of the invention.

FIG. 2 shows the coupling piece 8 in detail. The coupling piece 8 has a cylindrical construction and comprises a column piece 22, two coupling sleeves 24 and a protecting tube 28, which are disposed coaxially one within the other. At right angles to the longitudinal axis 19 of the coupling piece 8, an engagement projection 18 is formed on the end faces of the column piece 22 and also on the corresponding end faces of the coupling sleeves 24. The housing 42 of a carrier locking device 40 essentially designed as a mechanical switch is formed and attached to the shell face of the protecting tube 29 in such a manner that a portion of the protecting tube 28 forms the base of the housing 42.

Figure 3:
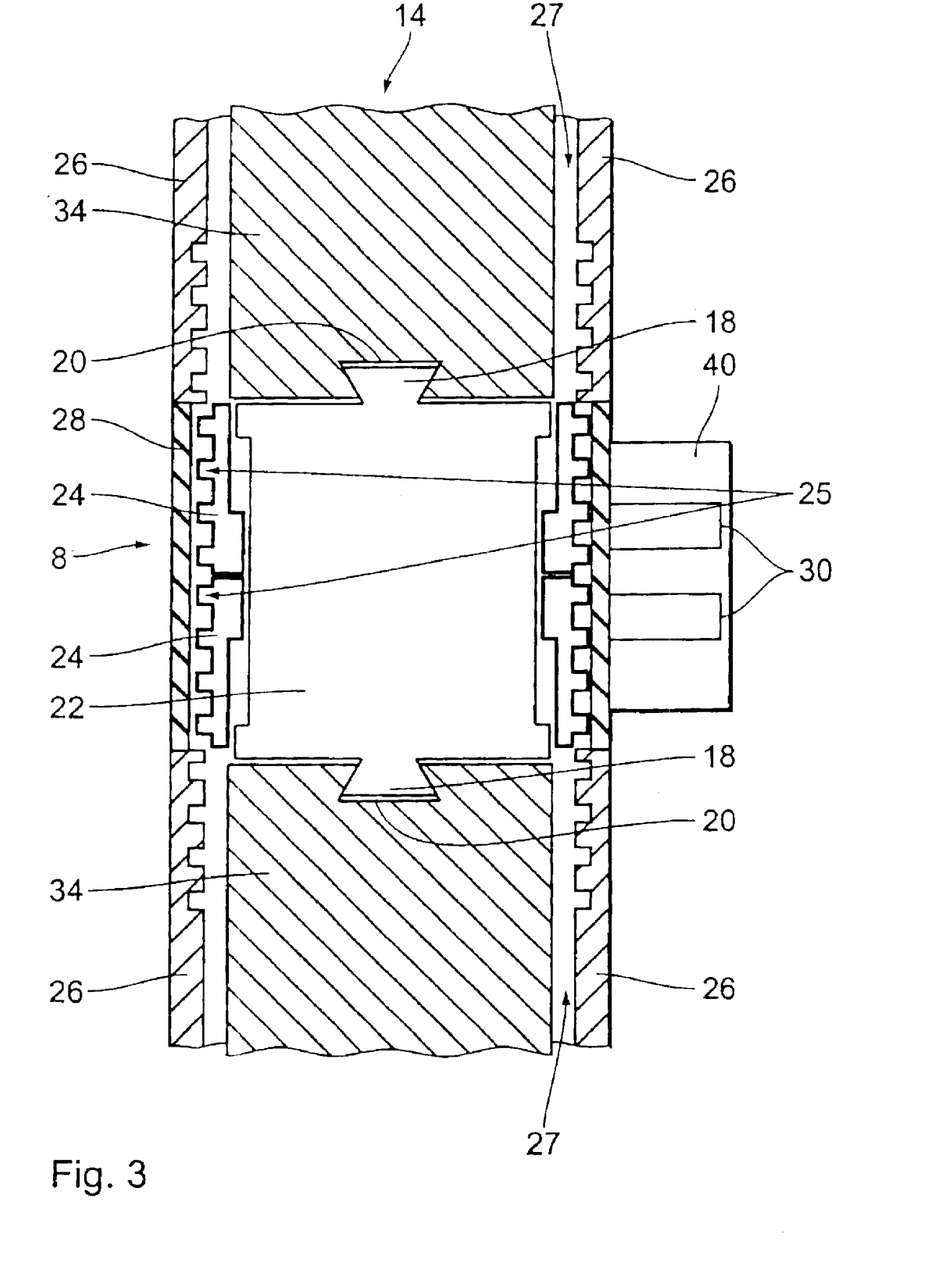
FIG. 3 shows a view in section of the coupling piece inserted between two steering column parts according to the first embodiment of the invention.
Figure 4:
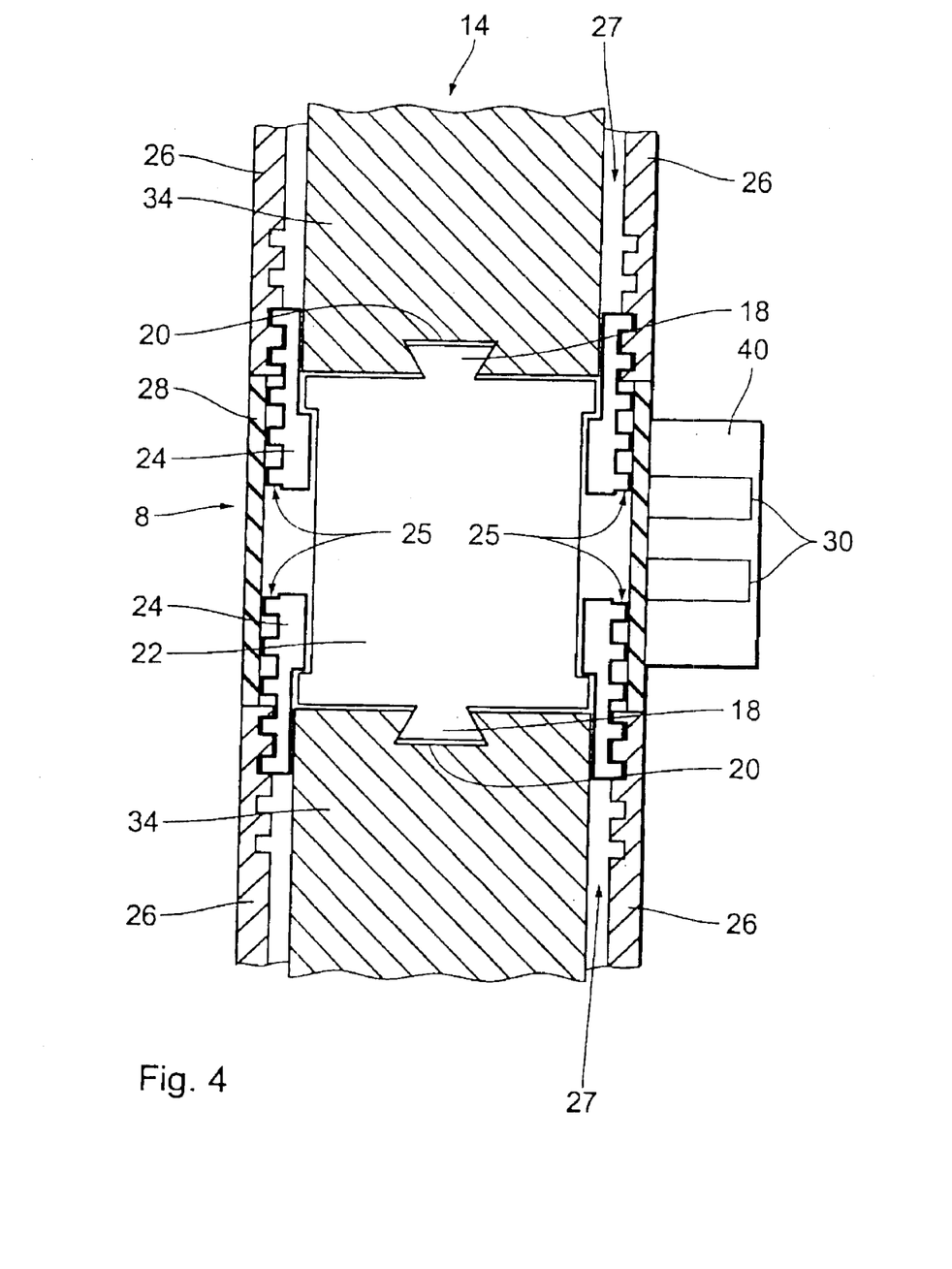
FIG. 4 shows the same view as FIG. 3, in which the coupling sleeves are screwed into respectively adjacent sections of a head tube constructed on the bicycle frame.

In the representation in FIGS. 3 and 4, the coupling piece 8 is inserted between two steering column parts 34 in such a manner that the column piece 22 connects the steering column parts 34 to one another and the unit comprising the steering column parts 34 and column piece 22 forms the steering column 14. In this case the engagement projections 18 constructed on the end faces of the column piece 22 in each case engage with a groove 20, which on the end side is constructed in the respective adjacent steering column part 34 as a complementary means to the engagement projection 18, so that the steering column parts 34 are connected to one another in rotationally fixed manner. The protecting tube 28 of the coupling piece 8 inserted into the recess 10 of the head tube 26 aligns with the head tube 26.

The coupling sleeves 24 comprise on their outer side a multiple-start external thread 25, which is provided for an engagement with a corresponding internal thread 27 on the inner side of the respective adjacent portion of the head tube 26. The threads are designed to run in opposite directions. Attached to the two coupling sleeves 24 of the coupling piece 8 is a carrier 30, which is designed as a pin and extends radially through a slot 32 (cf. FIG. 5) in the wall of the protecting tube 28 into the interior of the carrier locking device 40. As shown in FIG. 3, the coupling sleeves 24 abut one another, whereas, as shown in FIG. 4, the coupling sleeves 24 are screwed into the respective adjacent portion of the head tube 26 by rotating the protecting tube 28.

Figure 5:
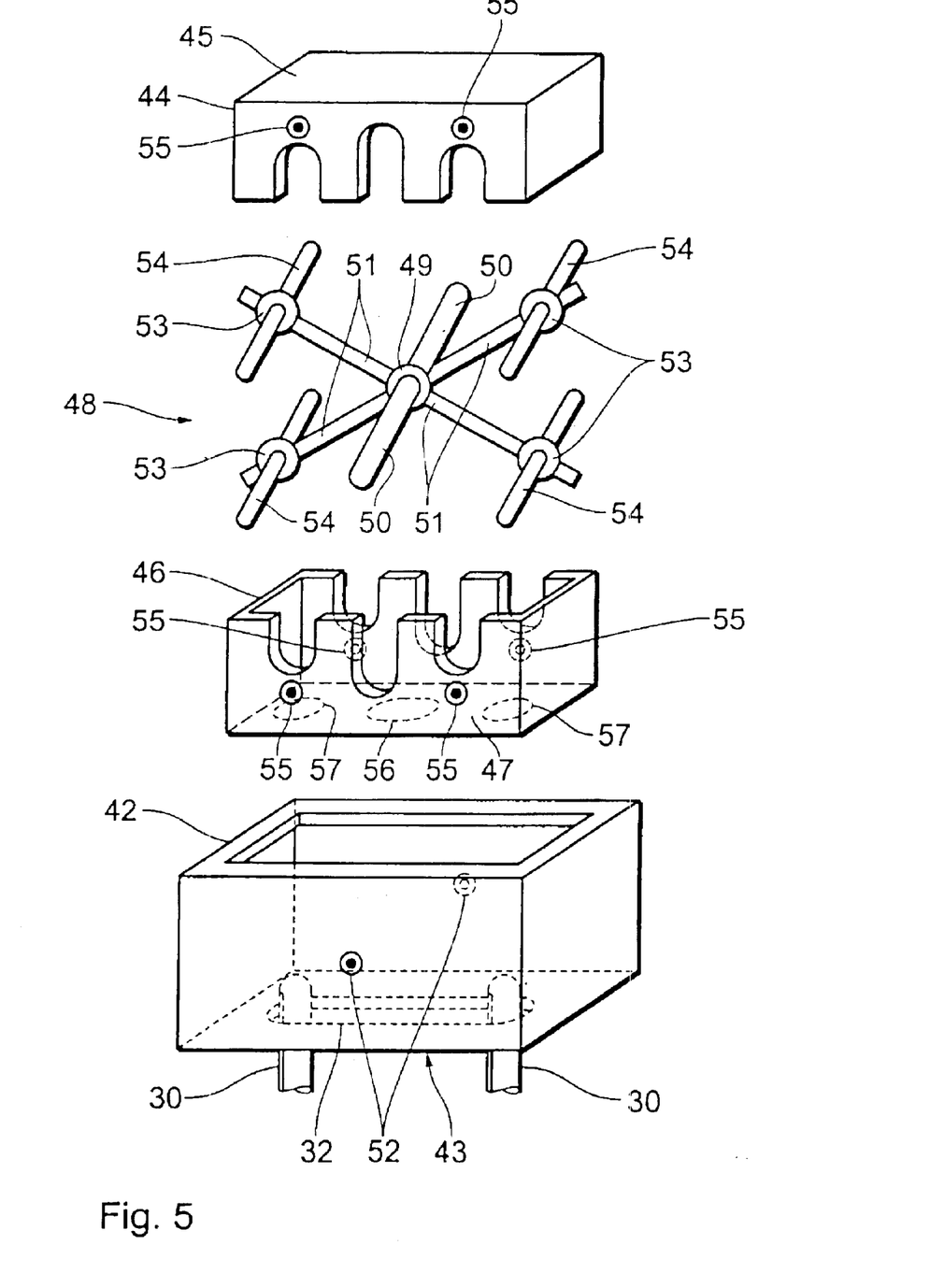
FIG. 5 shows an exploded representation of a carrier locking device according to the first embodiment of the invention.

The structure of the carrier locking device 40 is represented in FIG. 5. The carrier locking device 40 comprises the housing 42 moulded in one piece or fixed to the protecting tube 28 (cf. FIGS. 2–4), a press button 44 and an abutment 46, which in each case have a box-shaped design in such a manner that they can be inserted into one another. In the base 47 of the abutment 46 there are a central oblong first locking hole 56 and also two peripheral second locking holes 57 which are spaced from one another in the longitudinal direction of the coupling piece 8.

The press button 44 and the abutment 46—which are opposite one another—are displaceably connected to one another by means of articulated pincers 48 having two pincer arms 51. Bearings 53 are pushed onto the pincer arms 51. Each bearing 53 is disposed fixed with respect to the press button 44 and the abutment 46 by means of a pin 54 which is mounted moveably therein, and which is retained in corresponding bores 55 in the wall of the press button 44 or of the abutment 46. In another embodiment, not shown, the pincer arms 51 are provided with slots through each of which a pin 54, which is retained in two corresponding, mutually opposite bores 55 in the wall of the press button 44, or in the wall of the abutment 46, is placed in such a manner that each pincer arm 51 is mounted displaceably in the longitudinal direction on two pins 54. The press button 44 and the abutment 46 are initially stressed away from one another by springs (not shown), which are disposed between the upper part 45 of the press button 44 and the base 47 of the abutment 46, in such a manner that the base 47 of the abutment 46 lies on the base 43 of the housing 42 or the corresponding wall portion of the protecting tube 28 when—as explained below—the carriers 30 are in engagement with the locking holes 56 or 57.

The articulated pincers 48 are connected to the housing 42 by the pincer articulation 49 being mounted on a shaft 50, which in turn is mounted in bores 52 in the wall of the housing 42 and is thus fixed.

The carriers 30 protrude through the slot 32 in the base 43 into the interior of the housing 42. If the distance between the carriers 30 corresponds to the distance between the second locking holes 57 in the base 47 of the abutment 46, the carriers 30 are in a first locking position and are in each case housed by the associated second locking hole 57. When the carriers 30 lie adjacent to one another, they are situated in a second locking position and are jointly housed by the central first locking hole 56 in the base 47 of the abutment.

If the coupling sleeves 24—as represented in FIG. 4—are screwed into the adjacent head tube portions 26 to a predetermined extent, the carriers 30 are situated on the coupling sleeves 24 in the first locking position. The carriers protrude through the slot 32 in the protecting tube 28 into the interior of the housing 42 and are in each case housed in an associated second hole 57 in the base 47 of the abutment 46. Thus the coupling sleeves 24 are locked with the carriers 30, since a movement of the carriers 30 along the connecting line between the second holes 57, which runs in the longitudinal direction of the coupling piece 8, cannot take place, as a result of which a movement of the coupling sleeves 24 accompanied by a reduction of their axial spacing is prevented. Since the column piece 22 connects the steering column parts 34 to one another in rotationally fixed manner, and furthermore the coupling piece 8 with the column piece 22 cannot be removed from the recess 10 in the head tube 26 as long as the coupling sleeves 24 are screwed into the respective adjacent portion of the head tube 26, and finally the coupling sleeves 24 cannot be screwed into the protecting tube 28 and out of the adjacent portions of the head tube 26 because of the fixing of the spacing, the coupling piece 8 is locked in the first state, the non-secured position.

A transition from the non-secured position into the secured position takes place as follows: To neutralise the locking, the user actuates the press button 44, by which the articulated pincers 48 fixed with respect to the housing 42 are closed. The articulated pincers 48 pull the press button 44 and the abutment 46 towards and into one another against the initial stress of the springs. At the same time the base 47 is raised from the housing base 43. The carriers 30 are released from the peripheral locking holes 57 in the base 47 of the abutment 46. If, in this state, the user twists the protecting tube 28, the carriers 30 in the slot 32 in the wall of the protecting tube 28 are entrained and in turn entrain the coupling sleeves 24. At the same time, depending on the direction of rotation, the coupling sleeves 24 are unscrewed from the adjacent portion of the head tube 26 or are screwed into it in such a manner that the coupling sleeves 24 change their mutual axial spacing in the course of the rotation by virtue of the oppositely directed threads. Accordingly the spacing of the carriers 30 from one another also alters. During the rotation of the protecting tube 28 between the first and the second locking position, the carriers 30 run along the lower and outer side of the base 47 of the abutment 46 and thus prevent a lowering of the abutment 46 onto the base 43 of the housing against the initial stress exerted by the springs.

When the coupling sleeves 24 are unscrewed from the respective adjacent portion of the head tube 2, the carriers 30 are situated in the second locking position. If the press button 44 is now released, the press button 44 and the abutment 46 are pushed apart by virtue of the initial tension exerted by the springs. At the same time the two carriers 30 are together brought into engagement with the central locking hole 56 in the base 47 of the abutment 46. Thus the carriers 30 are locked with the coupling sleeves 24 in the secured position. Since the coupling sleeves 25 are unscrewed from the adjacent portions of the head tube 26, the coupling piece 8 can now be removed from the recess 10 and be brought into a secured position.

A second embodiment of the anti-theft device according to the invention is represented in FIGS. 6 to 12. In the second embodiment of the invention, the separating means is constructed as a connecting element 60. The connecting element 60 represented in detail in FIG. 6 (but without expansion elements) comprises an essentially cylindrical core 58, which is provided with an axial bore 56, and also two engagement bars 70. Each engagement bar 70 has a roughly U-shaped design with two limbs 71, which are spaced from one another by a transverse bar 75. The free ends of the engagement bar 70 are formed on the core 58 in such a manner that the engagement bars 70 lie opposite one another in one plane and form a rectangle, the median line of which coincides with the longitudinal axis of the core 58 and forms the centre axis 64 of the connecting element 60.

Figure 7:
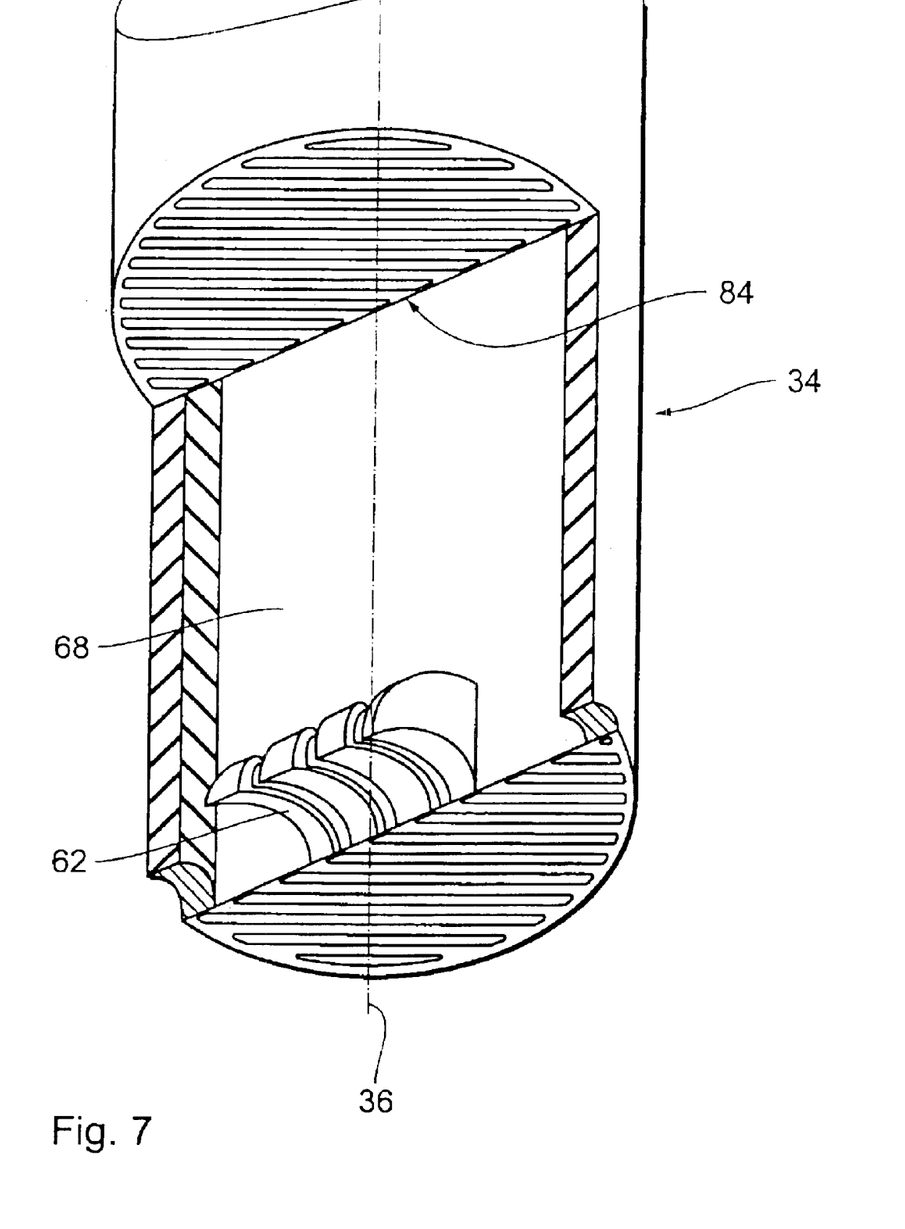
FIG. 7 shows a perspective view of a steering column part constructed with a claw according to the second embodiment of the invention.

An individual profile 67 is constructed on the inner face of the transverse bar 75 of the engagement bar 70 which faces the core 58. The engagement bar 70 is provided for receiving a claw 62, which—as represented in FIG. 7—is constructed on the free end of a steering column part 34. The claw 62 in turn comprises a profile which is complementary to the profile 67 of the associated transverse bar 75.

Figure 6:
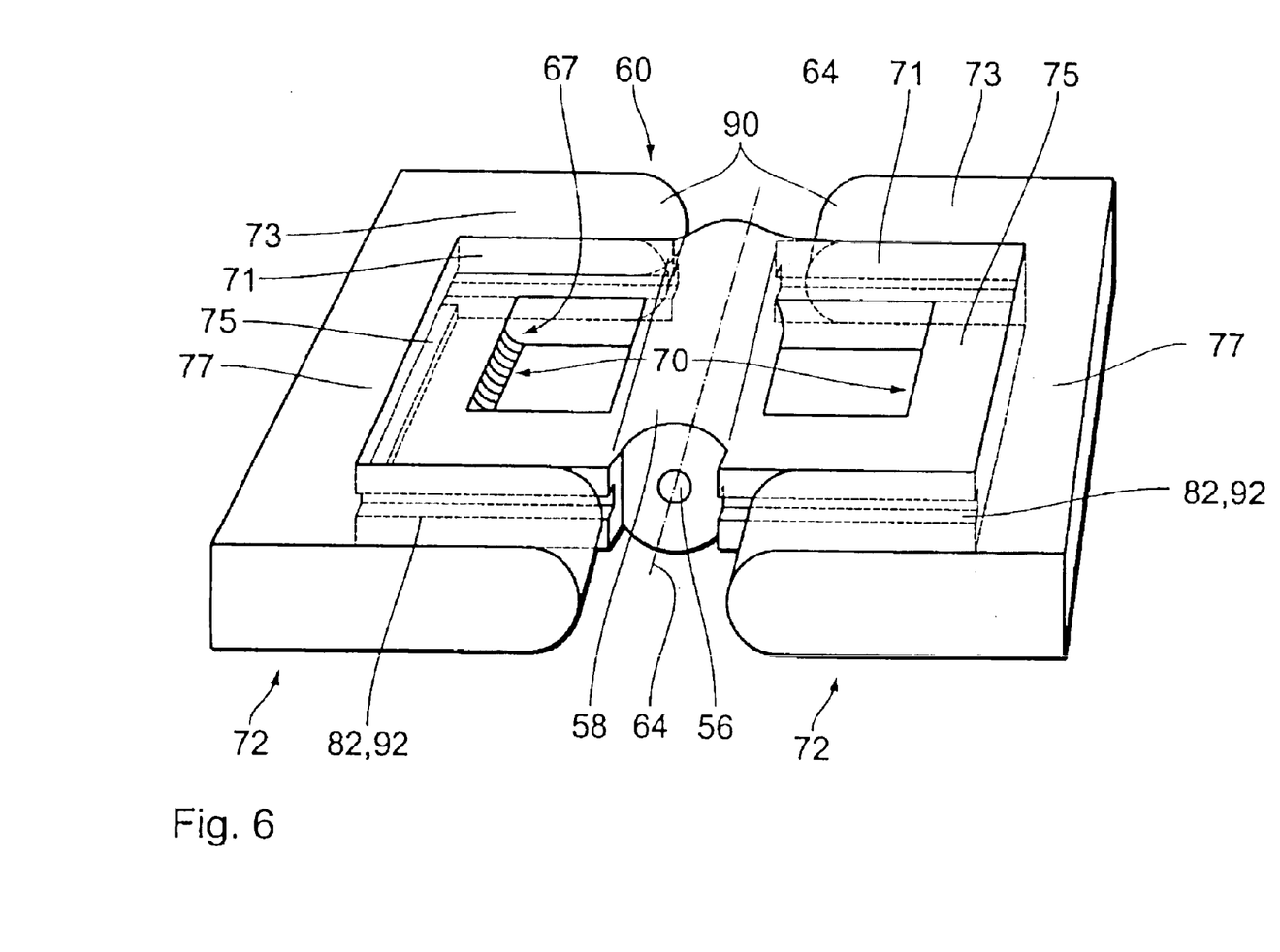
FIG. 6 shows a perspective view of a coupling piece according to a second embodiment of the invention.

The connecting element 60 also comprises two locking bars 72. The locking bars 72 have—like the engagement bars 70—a roughly U-shaped construction each with two limbs 73, which are spaced from one another by a transverse bar 77. The locking bars 72 lie opposite one another in the plane of the engagement bars 70, are separated from one another along the centre axis 64 and are initially stressed with respect to one another. The opposite end faces 90 at the free ends of the locking bars 72 have a convex construction.

The surface of the engagement bar 70 facing the limb 73 of the locking bars 72 is provided with a radially extending guide groove 92. A radially extending rail 82, which engages with the associated guide groove 92 of the engagement bar 70, is formed on the surface of the locking bars 72 facing the limbs 71 of the engagement bars 70. As a result the locking bars 72 are displaceably mounted radially to the centre axis 64 on the engagement bars 70.

Figure 8:
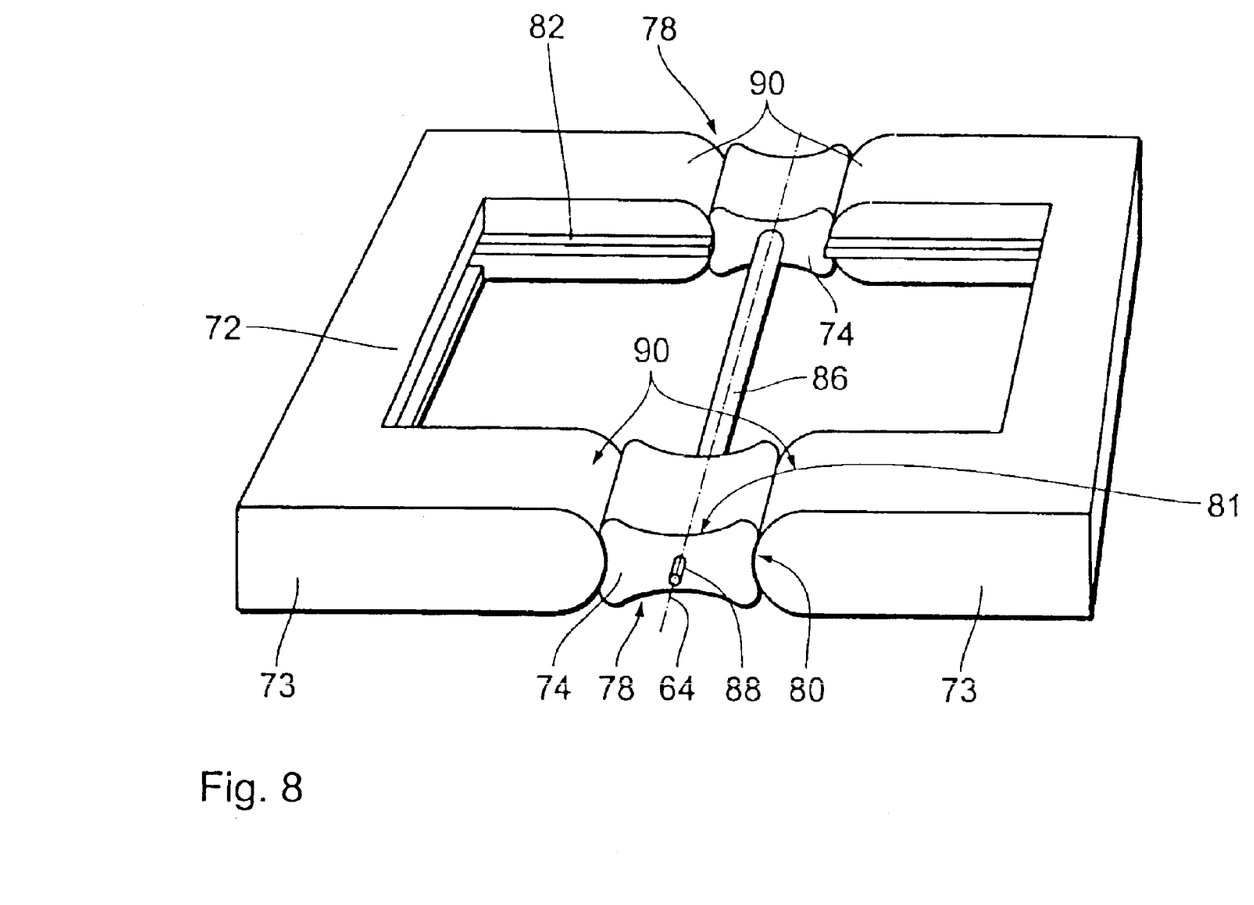
FIG. 8 shows a perspective view of a expansion element with abutting locking bars according to the second embodiment of the invention.

For better understanding, the mutually opposite locking bars 72 are represented without a core 58 and engagement bars 70 in FIG. 8. Two roughly cuboidal expansion elements 78 are clamped between the locking bars 72 which lie opposite each other and are initially stressed in relation to one another. The expansion elements 78 are fixed to the free ends of a rod 86 in such a manner that the rod axis passes at right angles through the end faces 74 of the expansion elements 78. The rod 86 is rotatably mounted in the axial bore 56 of the core 58 so that the rod axis coincides with the centre axis 64 of the connecting element.

The expansion element 78 comprises a substantially rectangular cross-sectional profile with two mutually opposite wide sides 81 and two narrow sides 80 disposed at right angles to the wide sides 81. The corners of the cross-sectional profile are rounded and its sides each have a concave construction.

As the expansion elements 78 in each case are clamped between the locking bars 72 which are initially stressed against one another, there is a frictional connection between each expansion element 78 and the limbs 73 of the locking bars 72 pressing against this expansion element 78. The frictional connection is supplemented by a form-fit connection, since in each case the convex end faces 90 of the locking bars 72 fit against the associated concave side faces of the expansion element 78.

When the cuboidal expansion elements 78 abut with the face of the wide side 81 against the end faces 90, the locking bars 72 are spaced from one another roughly by the length of the narrow side 80 of the expansion elements 78. If, on the other hand, the expansion elements 78 abut the end faces 90 with the face of the narrow side 80 (cf. FIG. 8), the locking bars 72 are spaced from one another roughly by the length of the wide side 81. Thus the rotational position of the expansion elements 78 between the locking bars 72 determines the spacing of the locking bars 72 from one another.

With the embodiment of the invention at present being described, a lock (not represented) is situated in the expansion element 78 for additional security. The lock can be operated by means of a key, which can be inserted into the expansion element 78 through an opening 88. When the key is inserted into the lock and it fits, the user can rotate the expansion elements 78 connected to one another by the rod 86 around the centre axis 64 by means of the key. As a result of the frictional and form-fit connection of the expansion elements 78 with the locking bars 72, the latter follow the rotational movement of the expansion elements 78. During this rotational movement the locking bars 72 entrain the engagement bars 70 with the core 58, as the rails 82 of each locking bar 72 engage in the respective associated guide grooves 92 of the engagement bars 70.

Figure 9:
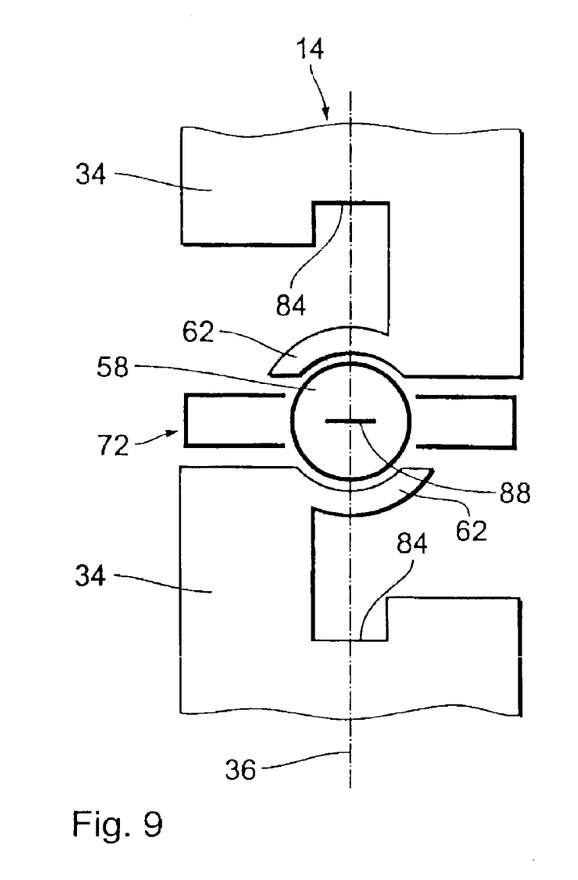
FIGS. 9 to 12 each show a sectional view of the connecting element according to the second embodiment of the invention on the path of movement between a secured position and a non-secured position.
Figure 10:
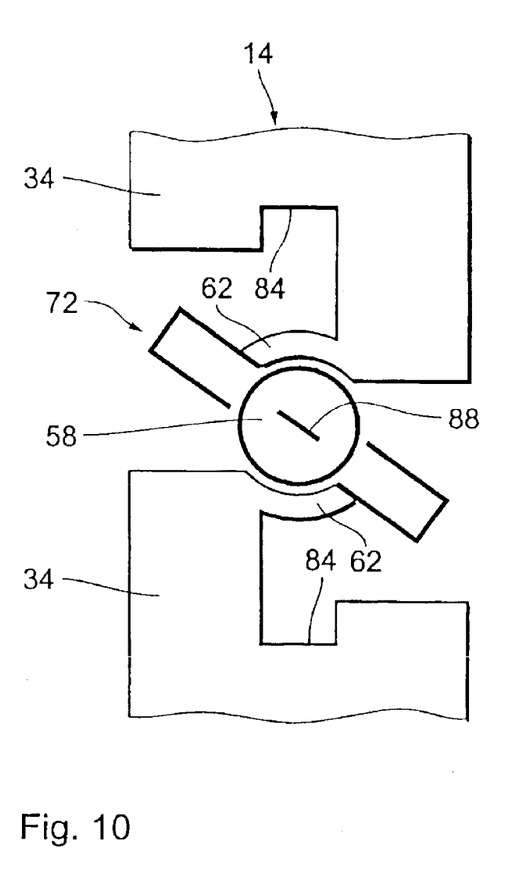

The use of the connecting element 60 is described below. FIGS. 9–12 diagrammatically show individual steps of the transition from the secured position, in which the rotationally fixed coupling of the steering column parts 34 is neutralised, into the non-secured position, in which the rotationally fixed coupling of the steering column parts 34 is produced. Through an opening in the wall of the head tube 26 in the portion provided to receive the connecting element 60 (not represented in FIGS. 9–12), the connecting element 60 is inserted into the interior of the head tube 26 between the steering column parts 34. As represented in FIG. 9, the connecting element 60 inserted between the steering column parts 34 lies in a plane through which the steering column axis 36 perpendicularly passes. The locking bars 72 clamp the expansion elements 78 (not represented in FIGS. 9–12) between the end faces 90 of the free ends of their limbs 73. At the same time the expansion elements 78 abut the end faces 90 by the faces of the wide sides 81. The distance between the free ends of the mutually opposite locking bars 72 is thus determined by the length of the narrow side 80 of the expansion elements 78.

Figure 11:
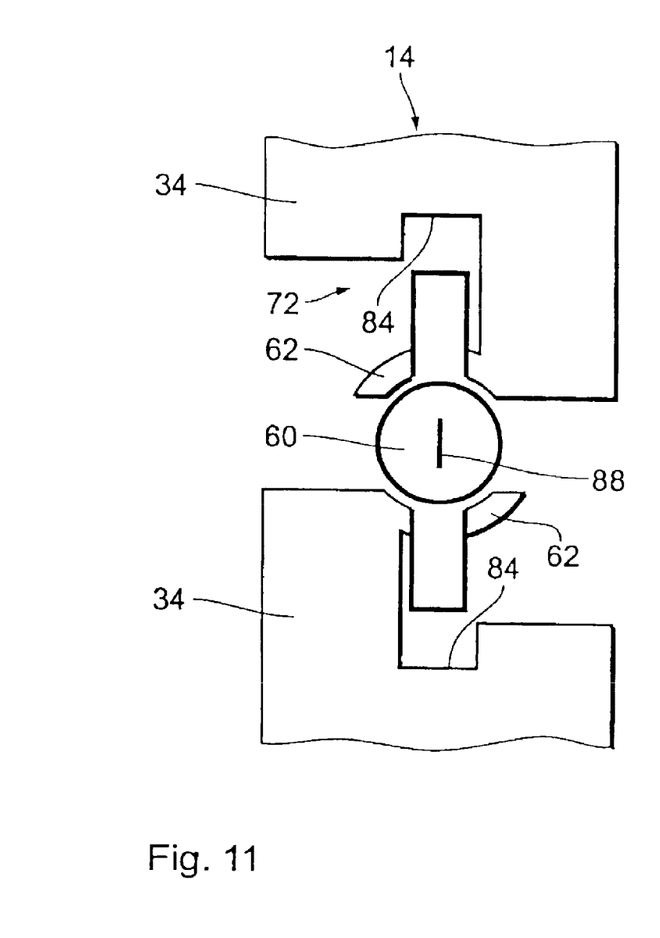

The user pushes the key (not represented) through the opening 88 into the lock and turns it—in the anti-clockwise direction in the representation. Upon turning the key—by 45ø in FIG. 10 and by 90ø in FIG. 11—the connection element 60 is entrained in the manner described above. The engagement bars 70 are pushed over the claws 62, which are constructed on the steering column parts 34. The profile 68 constructed on the claw 62 in so doing moves into engagement with the profile 67 on the inner side of the engagement bar 70. The rotational movement can only be completed when the profiles 67 and 68 are complementary, so that the engagement of the profiles 67 and 68 with one another succeeds. When the connection element is turned—as represented in FIG. 11—by 90ø, the claws 62 hold the engagement bars 70. The steering column parts 34 are connected to one another in rotationally fixed manner and the safety device for bicycle is released.

Figure 12:
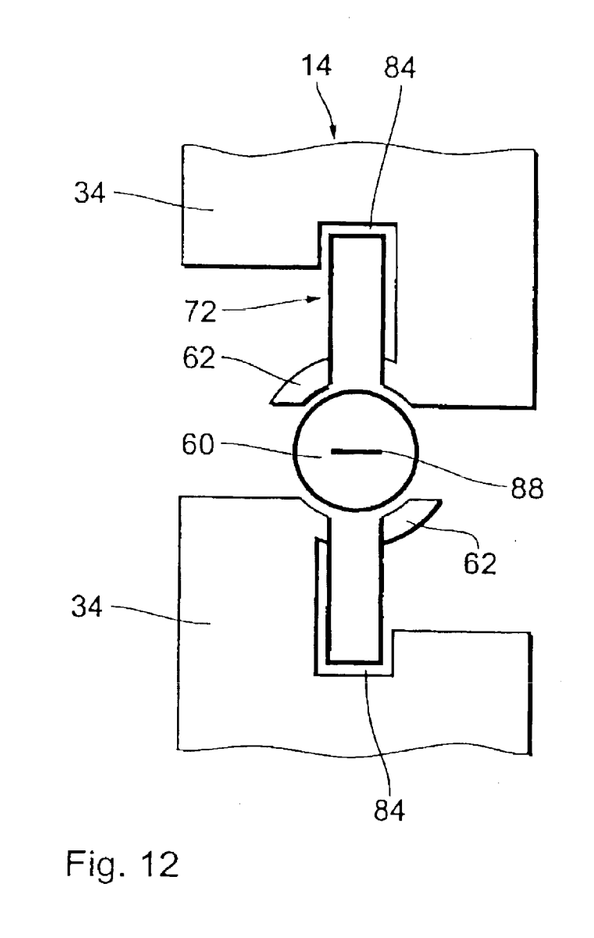

For the specially reliable release of the safety device of the bicycle, the user rotates the key by a further 90ø (cf. FIG. 12). The connecting element 60 cannot follow this further quarter-circle rotation, because the claws 62 retain the engagement bars 70. If, however, the turning moment applied by the user is sufficient to neutralise the frictional and form-fit connection of the expansion elements 78 with the locking bars 72, just the expansion elements 78 follow this further rotation of the key. As a result of this further rotation, the locking bars 72 are pushed apart slight further than before, as the expansion elements 78 are rotated between the locking bars 72 in such a manner that the mutual spacing of the locking bars 72 is now determined by the length of the wide side 81 instead of the narrow side 80 of the expansion element 78 (cf. also FIG. 8). The locking bars 72 are housed by locking recesses 84 constructed in the steering column parts 34 (cf. FIG. 7) so that an uncontrolled backward rotation of the connecting element 60 into the secured position is not possible. The connecting element 60 is thus reliably locked in the non-secured position.

For a transition of the connecting element 60 into the secured position, the user firstly has to turn back the expansion elements 78—as shown in the representation of FIGS. 9–12 in the anti-clockwise direction—before he then rotates the connection element 60 into the secured position and removes it from the head tube, by which the rotationally fixed coupling of the bicycle handlebar 6 with the fork 5 is completely removed.

What is claimed is:

1. An anti-theft device for a vehicle comprising frame and a steering column for steering the vehicle which steering column rotationally fixedly couples a steering mechanism, said device comprising:

a coupling piece for neutralising the rotationally fixed coupling, which separates the steering column into two parts and produces the rotationally fixed coupling of these steering column parts when in a first state and neutralises it when in a second state, and wherein the coupling piece comprises a column piece, which in the first state is inserted between the steering column parts and aligns with them, and which in the second state is completely removed from the steering column parts.

2. The anti-theft device of claim 1, wherein the column piece has a substantially reflection-symmetrical or point-symmetrical construction and on either side of the plane of symmetry has recesses and/or projections, which in the first state engage with complementary means constructed on the steering column parts and in so doing make a form-fit and/or frictional connection and in the second state are released from the complementary means.

3. The anti-theft device of claim 1, wherein the column piece is housed in two coupling sleeves disposed axially next to one another and comprising external threads which are in each case provided for an engagement in a corresponding internal threads in the respective adjacent section of the bicycle frame.

4. The anti-theft device of claim 3, wherein the threads are multiple start.

5. The anti-theft device of claim 4, wherein the thread pitch is sufficient to achieve an axial displacement by a predetermined insertion length of the respective coupling sleeve with at most one revolution of each coupling sleeve around the column piece.

6. The anti-theft device of claim 5, further comprising a protecting tube for housing the column piece and the coupling sleeves, which is detachable from the vehicle and which comprises axially displaceable carriers, which upon a rotation of the protecting tube entrain the coupling sleeves.

7. The anti-theft device of claim 3, wherein the thread pitch is sufficient to achieve an axial displacement by a predetermined insertion length of the respective coupling sleeve with at most one revolution of each coupling sleeve around the column piece.

8. The anti-theft device of claim 7, further comprising a protecting tube for housing the column piece and the coupling sleeves, which is detachable from the vehicle and which comprises axially displaceable carriers, which upon a rotation of the protecting tube entrain the coupling sleeves.

9. The anti-theft device of claim 8, wherein the carriers are radial pins, which protrude outwardly through at least one axial slot in the protecting tube and which in each case engage with one of the coupling sleeves.

10. The anti-theft device of claim 8, wherein the carriers are radial pins, which protrude outwardly through at least one axial slot in the protecting tube and which in each case engage with one of the coupling sleeves.

11. An anti-theft device for a vehicle comprising a steering column for steering the vehicle, which steering column rotationally fixedly couples a steering mechanism, said device comprising:

a connecting element for neutralising the rotationally fixed coupling, which separates the steering column into two puts and produces the rotationally fixed coupling of these steering column parts when in a first state and neutralises it when in a second state and wherein the connecting element has an angular or frame-shaped construction with engagement bars, which are provided for the engagement with claws of the steering column parts in the first state and which move from the first state into the second state by a rotational movement of the connecting element around a center axis thereof at preferably right angles to an axis of the steering column.

12. The anti-theft device of claim 11, wherein, in the second state, the connecting element with the steering column can be removed therefrom or inserted therein, through an opening in the wall of the vehicle.

13. The anti-theft device of claim 12, wherein the connecting element comprises an individual profile which can be brought into engagement with a complementary profile on the claws, on a section of the engagement bars that faces the center axis.

14. The anti-theft device of claim 13, wherein the engagement bars are separated from one another, are radially displaceable with respect to the center axis and can be brought into engagement with locking recesses in the steering column parts.

15. The anti-theft device of claim 13, wherein the engagement bars form an inner ring, which is surrounded by an outer ring comprising locking bars which are separated from one another by the formation of end faces and in each case are displaceably mounted on the associated engagement bar of the inner rings, and which also comprises expansion elements rotatably mounted around the center axis between the end faces of the locking bars for pushing apart the locking bars against an initial stress.

16. The anti-theft device of claim 15, wherein a cross-sectional profile of the expansion elements has a substantially rectangular construction, in a plane through which the center axis passes at right angles.

17. The anti-theft device of claim 16, wherein the sides of the cross-sectional profile of the expansion elements have a concave construction.

18. The anti-theft device of claim 16, wherein the cross sectional profile has rounded corners.

19. The anti-theft device or claim 11, wherein the connecting element has a substantially reflection-symmetrical or point-symmetrical construction and on either side of the plane of symmetry has recesses and/or projections, which in the first state engage with complementary means constructed on the steering column parts and in so doing make a form-fit and/or frictional connection and in the second state are released from the complementary means.

* * * * *